START UP CIRCUIT FOR ADAPTIVE EQUALIZER
Filed July 18, 1968
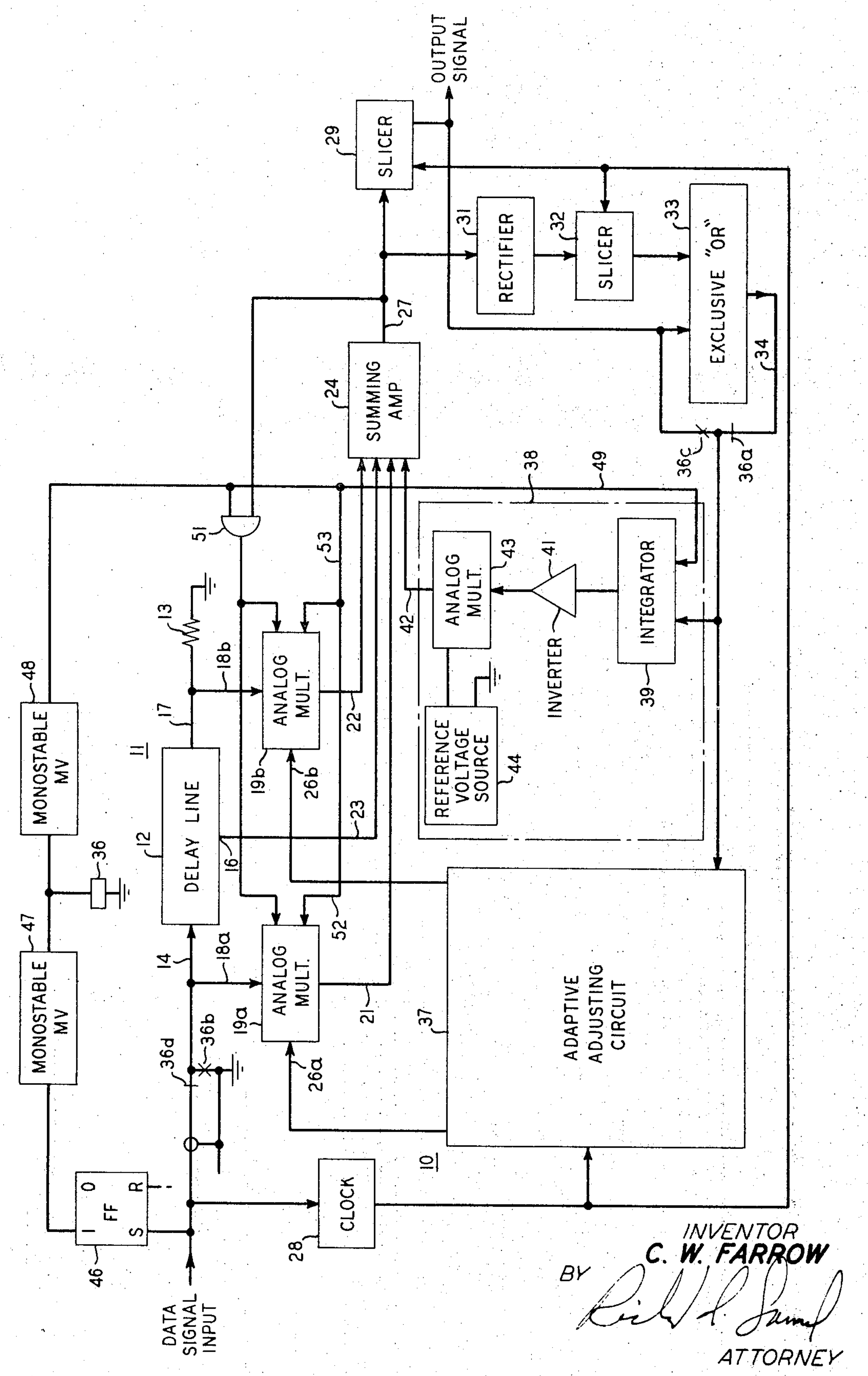
INVENTOR
C. W. FARROW
BY
ATTORNEY 3,564,457

START UP CIRCUIT FOR ADAPTIVE EQUALIZER

Cecil W. Farrow, Monmouth Hills, N.J., assignor to Bell Telephone Laboratories Incorporated, Murray Hill, N.J.

Filed July 18, 1968, Ser. No. 745,928
Int. Cl. H04b 3/04
U.S. Cl. 333—18 7 Claims

ABSTRACT OF THE DISCLOSURE

An adaptive transversal filter equalizer is described in which voltage controlled analog multipliers are employed as tap attenuators in conjunction with a D.C. offset adjusting loop. A special start-up circuit controls a start-up sequence so that the multiplication factors of the tap attenuators can be set to zero and the D.C. offset can be set to zero in a noninteracting manner.

FIELD OF THE INVENTION

This invention relates to a system for equalizing a signal transmitted through a signal distorting medium and particularly to a signal equalization system in which the D.C. transfer characteristic is initially adjusted.

BACKGROUND OF THE INVENTION

When a multifrequency signal which includes a series of individual symbols of bauds is transmitted through a bandwidth limited medium, different frequency components in the signal may be delayed and attenuated different amounts. As a result, components from more than one of the individual symbols may coincidentally arrive at a signal receiver thereby causing intersymbol interference. One device used to equalize a received signal distorted by intersymbol interference is a transversal filter. The transversal filter is a time-domain device in which one or more equalization signals, each equal to a multiple of the received signal displaced in time, are added to the received signal to provide an equalized output signal.

When transmitting digital data over direct distance dialing voice channels, a new distorting transmission medium is established for each call. These voice channels must be equalized quickly compared to the time of data transmission to render equalization practical.

A system disclosed by F. K. Becker-R. W. Lucky-E. Port in U.S. Pat. No. 3,292,110, entitled "Transversal Equalizer for Digital Transmission Systems Wherein Polarity of Time-Spaced Portions of Output Signal Controls Corresponding Multiplier Setting," issued Dec. 13, 1966, automatically and systematically adjusts a transversal filter during an initial training signal transmission period. A system disclosed by R. W. Lucky in U.S. Pat. No. 3,368,168, entitled "Adaptive Equalizer for Digital Transmission Sysstems Having Means to Correlate Present Error Component with Past, Present and Future Received Data Bits," which issued on Feb. 6, 1968, eliminates the need for a training period by adjusting a transversal filter in response to information extracted from the received digital data signal. Another system disclosed by R. W. Lucky in a copending application filed Aug. 27, 1965, Ser. No. 483,129 entitled "Digital Adaptive Equalizer System," now U.S. Pat. No. 3,414,819, issued Dec. 3, 1968, extends the system disclosed in the R. W. Lucky application, Ser. No. 460,794, now U.S. Pat. No. 3,368,168 issued Feb. 6, 1968, to adjust a transversal filter to compensate for intersymbol interference in a multilevel coded signal.

Each of the above-cited systems employs an analog-to-digital slicing circuit in extracting the automatic or adaptive adjusting information from the coded signal. Normally, the coded signal is symmetrical with respect to zero. Therefore, for binary coding, a "1" could be represented by a positive voltage and a "0" by a negative voltage.

Often, a received data signal to be equalized contains a D.C. component, thereby necessitating D.C. amplifiers as elements of the transversal filter equalizer. These amplifiers are one possible cause of D.C. offset which renders the signal supplied to the slicing circuit nonsymmetrical, thereby preventing optimum equalization and causing an increased output error rate.

A system disclosed in a copending application (now U.S. Pat. No. 3,477.043 issued Nov. 4, 1969) of C. W. Farrow, Ser. No. 700,240, entitled "Automatic D.C. Offset Compensation Circuit for Automatic Equalizer" and filed Jan. 24, 1968 adaptively adjusts the D.C. transfer characteristic of the equalizer in response to the signals derived from the analog-to-digital slicing circuit. This system not only adjusts the D.C. offset but improves overall equalization by lowering the error rate in the information derived from the analog-to-digital slicing circuit.

In equalizers which employ voltage controlled devices for tap multipliers, as disclosed for example, in the applications of E. Port, Ser. No. 663,148, entitled "Analog Multiplier Circuit," filed Aug. 24, 1967 (now U.S. Patent No. 3,475,601 issued Oct. 28, 1969), and D. Hirsch, Ser. No. 728,644, entitled "System for Initially Setting a Plurality of Interacting Analog Multipliers," filed May 13, 1968, the D.C. level at the output from the equalizer is employed to initially set the mutiplication factor thereof to zero. If, however, D.C. offset exists, the above-mentioned system will fail to set the multiplication factor to zero. On the other hand, if the multiplication factors are not set to zero, the time for adaptive adjustment of the equalizer will be prolonged. This interaction between D.C. offset control and multiplier zero setting renders the two systems incompatible.

BRIEF DESCRIPTION OF THE INVENTION

To take advantage of both adaptive D.C. offset control and voltage controlled tap multipliers, a system has been devised in which the D.C. offset is initially adjusted by grounding the input to the transversal filter equalizer and adjusting a D.C. level component of the output signal to bring the output signal to zero. This D.C. level component is maintained constant while the signal multiplication factor is set to zero.

The equalizer is now ready for normal adaptive operation. The input to the equalizer is removed from ground and the D.C. level component is brought under control of a signal indicating error polarity of the received signal.

By initially grounding the input to the equalizer and driving the output to zero, instead of applying a "1" or "0" to the input and driving the output to an appropriate value, the effect of nonzero tap multiplier settings is made negligible.

DESCRIPTION OF THE FIGURE

The sole figure is a schematic block diagram showing a transversal filter equalizer embodying the principles of this invention.

DETAILED DESCRIPTION

The figure shows an adaptive transversal filter equalization system 10 of the type disclosed in my aforementioned Pat. No. 3,477,043 modified to incorporate the principles of the present invention. A transversal filter 11 includes a center tap delay line 12 terminated in its characteristic impedance 13 for providing three identical signals displaced in time. One signal is available at an input terminal 14 of the delay line 12, a second signal at a center tap 16 of the delay line 12, and a third signal at an output terminal 17 of the delay line 12. It should be understood that a transversal filter, utilizing any number of time displaced signals, may be employed in the system of this invention. Only three such time-displaced signals have been selected in this instance as an example for ease of explanation.

The input terminal 14 and the output terminal 17 of the delay line 12 are connected to first signal input terminals 18*a* and 18*b* of a pair of D.C. coupling analog multipliers 19*a* and 19*b*, respectively. Leads 21, 22, and 23 connect the multipliers 18*a* and 18*b* and the center tap 16 respectively, to a D.C. summing amplifier 24. When appropriate signals are applied to second input leads 26*a* and 26*b* of the analog multipliers 19*a* and 19*b*, respectively, an equalized signal appears on an output lead 27 of the summing amplifier 24.

In accordance with common practice, a clock 28 phase locked to a received data signal synchronizes operation of equalizer circuits. By way of example, a system for phase locking a sampling clock to a multilevel data signal is disclosed in the copending patent application of F. K. Becker-F. W. Lescinsky, Ser. No. 722,137, filed Apr. 17, 1968 (now U.S. Pat. No. 3,462,687, issued Aug. 19, 1969), and entitled "Automatic Phase Control for a Multilevel Coded Vestigial Sideband Data System." A system for phase locking a sampling clock to a binary data signal is disclosed in a patent application of D.C. Weller, Ser. No. 631,521, filed Apr. 17, 1967 (now U.S. Pat. No. 3,479,598, issued Nov. 18, 1969), and entitled "System for Phase Locking Two Pulse Trains."

The clock 28 periodically enables slicer 29 to slice the equalized signal. The slicer 29 may be gated Schmitt trigger circuit or a high gain differential amplifier having one of its differential inputs held at a reference slicing level. When the received data signal employs a positive signal to represent a "1" and a negative signal to represent a "0", the output from slicer 29 indicates the polarity of the received signal. The output from slicer 29 also indicates signal polarity for a symmetrical multilevel data signal.

The equalized signal on lead 27 is full wave rectified by rectifier 31 thereby providing a "folded" equalized data signal to slicer 32. Slicer 32 similar to slicer 29 provides an output signal indicating whether the absolute value of the equalized signal is greater or less than a normalized reference value. It should be clear that for multilevel signals the process of folding and slicing would be repeated an appropriate number of times.

Since the output of slicer 32 indicates whether the absolute value of the equalized signal is greater or less than the normalized reference value and the output of slicer 29 indicates signal polarity, a logical combination of the two will yield a signal indicative of the D.C. error polarity. This is done by EXCLUSIVE "OR" circuit 33 which provides the error polarity signal on lead 34.

During normal operation, the error polarity signal is fed through normally closed contact 36*a* of relay 36 to an adaptive adjusting circuit 37 and a D.C. control circuit 38. Adaptive adjusting circuits for transversal filter equalizers are now well known and may be of the type, for example, disclosed in my aforementioned Pat. No. 3,477,043. The D.C. control circuit 38 includes an integrator 39 which averages the error polarity signals. The average error polarity signal is inverted by inverter 41 to control a D.C. level component supplied to summing amplifier 24 on lead 42. In this embodiment, the D.C. level component is supplied to lead 42 by an analog multiplier 43 which multiplies a D.C. voltage supplied by reference voltage source 44 and the average error polarity signal from inverter 41. In this way, the average of the error polarities at the output of summing amplifier 24 is reduced to zero, thereby compensating for any D.C. offset in the transversal filter circuit 11.

When analog multipliers 19*a* and 19*b* are for example, the type disclosed by D. Hirsch in his aforementioned application Ser. No. 728,644, it is necessary to initially set the multiplication factors of such voltage controlled analog multiplier zero. It is also necessary to initially compensate for D.C. offset. If a positive or negative voltage is passed through the analog multipliers 19*a* when 19*b* and the multiplication factors are other than zero, the signals applied to summing amplifier 24 would be in error. This would show up as a D.C. error on lead 27 so that D.C. compensation could not be initially made. On the other hand, D.C. offset in the multipliers 19*a* and 19*b* and summing amplifier 24 would prevent accurate setting of the multiplier values to zero.

Therefore, in the present invention, a flip-flop 46 is employed to detect the initial receipt of data signals. The flip-flop 46 triggers monostable multivibrator 47, thereby applying an actuating signal to relay 36 for a predetermined interval. The actuation of relay 36 closes normally open contact 36*b* and thereby applies a D.C. ground to the input of transversal filter 11. The actuation of relay 36 also opens normally closed contact 36*a* and closes normally open contact 36*c*, thereby applying the signal polarity signal from slicer 29 directly to integrator 39 in place of the error polarity signal of EXCLUSIVE "OR" circuit 33. Normally closed contact 36*d* is also opened so that the grounding of the transversal filter input by contact 36*b* does not disturb the received signal.

The outputs provided by the analog multipliers 19*a* and 19*b* with inputs 18*a* and 18*b* grounded, are essentially the products of their own D.C. offsets and the multiplier settings. As the clock 28 enables slicer 29 to sample the output 27 of the summing amplifier 24. The sampled output signal is applied from the slicer 29 through contact 36*c* to integrator 39 depending upon the polarity of the signal on lead 27 with respect to ground. This signal is averaged in integrator 39 inverted in inverter 41, and the inverted signal is used to control analog multiplier 43 to provide a D.C. level on lead 42, which in turn drives the output terminal 27 of summing amplifier 24 to zero. In this way the D.C. offsets in multipliers 19*a*, 19*b*, and summing amplifier 24 are compensated.

After the predetermined interval, the signal from monostable multivibrator 47 terminates, thereby deactivating relay 36 and triggering monostable multivibrator 48. Deactivation of relay 36 opens contacts 36*b* and 36*c* and closes contacts 36*a* and 36*d*. This removes the ground from the input of the transversal filter 11 and reconnects the output signal from EXCLUSIVE "OR" circuit 33 to the D.C. level control circuit 38.

The output signal from monostable multivibrator 48, which appears on lead 49 to disable integrator 39 holding the D.C. value previously attained. The signal from monostable multivibrator 48 is also applied to transmission gate 51 and to analog multipliers 19*a* and 19*b* via leads 52 and 53, respectively, to enable the multiplication factors of analog multipliers 19*a* and 19*b* to be set to zero. Discussion of one system for setting voltage controlled analog multipliers to zero is disclosed in the aforementioned D. Hirsch application which in no way forms a part of this invention.

At the termination of the signal from monostable multivibrator 48, the equalizer 11 is ready to begin normal adaptive equalization of the received data signal.

At the termination of data signal reception, flip-flop 46 is reset by a pulse from a source, not shown, so that upon renewal of data reception, the equalizer tap can again go through the above-described start-up sequence.

What has been described is considered to be only illustrative of the principles of this invention. Accordingly, various and other arrangements may be devised by those skilled in the art without departing from the spirit and scope of this invention.

What is claimed is:

1. A system for equalizing a bipolar information signal having predetermined information levels, said signal having been distorted by transmission through a signal distorting transmission medium, said system comprising:

means for applying said information signal to an input terminal;

means for multiplying said information signal on said input terminal by a first value to provide an equalization signal;

means for algebraically combining said equalization signal, said information signal on said input terminal and a D.C. level signal to provide an equalized output signal;

means responsive to said equalized output signal for providing an equalized output signal polarity signal;

means for providing an error polarity signal indicative of the polarity of the difference between said equalized output signal and the nearest of said predetermined information indicative levels;

means for integrating signals applied thereto for providing an integrated signal;

means responsive to said integrated signal for supplying said D.C. level signal;

means responsive to a first control signal for bringing said input terminal to a predetermined voltage;

means normally applying said error polarity signal to said integrating means responsive to said first control signal for applying said signal polarity signal to said integrating means; and means responsive to initial receipt of said bipolar information signal for providing said first control signal for a first predetermined time.

2. The system as defined in claim 1 in which said information signal applying means includes means responsive to said first control signal for disconnecting said information signal from said input terminal.

3. The system as defined in claim 1 in which said multiplying means is responsive to a second control signal for bringing said first value to zero further comprising:

means rendered effective upon termination of said first control signal for generating said second control signal for a second predetermined time.

4. The system as defined in claim 3 also including:

means responsive to said second control signal for applying said equalized output signal to said multiplying means.

5. In combination:

a device having first and second input terminals and an output terminal, said device being responsive to first and second signals applied to said first and second input terminals respectively for providing an output signal proportional to a combination of said first and second signals;

a digitizing circuit responsive to said output signal for providing a digitized signal, said digitized signal assuming one of a predetermined number of states;

means normally responsive to said digitized signal and said output signal for providing a difference signal representing the polarity of the difference between said digitized signal and said output signal rendered effective by a control signal to provide a difference signal representing the polarity of said output signal; and means for integrating said difference signal for providing said second signal.

6. The combination as defined in claim 5 also including:

means responsive to said control signal for bringing said first input terminal to a predetermined voltage.

7. The combination as defined in claim in 6 also including:

means responsive to said first signal for providing said control signal.

References Cited

UNITED STATES PATENTS 3,070,786 12/1962 MacIntyre ---------- 330—9X

ROY LAKE, Primary Examiner

J. B. MULLINS, Assistant Examiner